US008930972B2

(12) United States Patent
Takasawa et al.

(10) Patent No.: US 8,930,972 B2
(45) Date of Patent: Jan. 6, 2015

(54) DISK DRIVE HAVING CHASSES WITH RECTIFYING PLATES

(71) Applicant: Sony Corporation, Tokyo (JP)

(72) Inventors: Takeharu Takasawa, Kanagawa (JP); Naofumi Goto, Kanagawa (JP); Takeshi Kubo, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/245,706

(22) Filed: Apr. 4, 2014

(65) Prior Publication Data

US 2014/0310733 A1 Oct. 16, 2014

(30) Foreign Application Priority Data

Apr. 12, 2013 (JP) ................... 2013-083950

(51) Int. Cl.
G11B 33/08 (2006.01)
G11B 17/04 (2006.01)

(52) U.S. Cl.
CPC ................... G11B 17/0401 (2013.01)
USPC ........................... 720/651; 720/706

(58) Field of Classification Search
CPC .. G11B 25/043; G11B 33/148; G11B 17/056; G11B 33/08; G11B 5/6005
USPC .......... 720/670, 668, 651, 706, 714
See application file for complete search history.

(56) References Cited

U.S. PATENT DOCUMENTS

| 5,583,716 | A * | 12/1996 | Akiba et al. | 360/99.01 |
| 5,768,238 | A * | 6/1998 | Tanaka | 720/600 |
| 5,914,929 | A * | 6/1999 | Kato et al. | 720/656 |
| 6,388,835 | B1 * | 5/2002 | Ariyoshi | 360/99.12 |
| 7,072,140 | B2 * | 7/2006 | Asano et al. | 360/97.13 |
| 7,346,914 | B2 * | 3/2008 | Urata et al. | 720/651 |
| 7,543,310 | B2 * | 6/2009 | Shizuya et al. | 720/601 |
| 7,554,762 | B2 * | 6/2009 | Suwa et al. | 360/97.14 |
| 7,616,402 | B2 * | 11/2009 | Suwa et al. | 360/97.14 |
| 7,690,008 | B2 * | 3/2010 | Shizuya et al. | 720/601 |
| 8,730,622 | B2 * | 5/2014 | Sawanaka | 360/264.8 |
| 2005/0135001 | A1 * | 6/2005 | Endo | 360/97.02 |
| 2007/0279799 | A1 * | 12/2007 | Suwa | 360/97.01 |

FOREIGN PATENT DOCUMENTS

JP 10-188456 A 7/1998

* cited by examiner

Primary Examiner — Brian Miller
(74) Attorney, Agent, or Firm — Wolf, Greenfield & Sacks, P.C.

(57) ABSTRACT

There is provided a disk drive apparatus including a first chassis unit that has a pickup base at which an optical pickup and a disk table have been disposed, and a first base chassis to which the pickup base has been attached, and a second chassis unit that has a second base chassis and at which a chucking pulley has been disposed. A first rectifying plate part is provided at the first base chassis. A second rectifying plate part is provided at the second base chassis.

7 Claims, 17 Drawing Sheets

DISK DRIVE HAVING CHASSES WITH RECTIFYING PLATES

CROSS REFERENCE TO RELATED APPLICATIONS

This application claims the benefit of Japanese Priority Patent Application JP 2013-083950 filed Apr. 12, 2013, the entire contents of which are incorporated herein by reference.

BACKGROUND

The present technology relates to a technical field relevant to a disk drive apparatus that performs recording or reproduction of an information signal to a disk-like recording medium in a state where the disk-like recording medium is sandwiched and chucked by a disk table and a chucking pulley.

There are disk drive apparatuses that perform recording and reproduction of information signals of image data, voice data, etc. to disk-like recording media. Among such disk drive apparatuses, for example, there is included a disk drive apparatus that sandwiches and chucks a disk-like recording medium by a disk table and a chucking pulley, and that performs recording and reproduction of an information signal to the disk-like recording medium (for example, refer to JP H10-188456A).

The disk drive apparatus described in JP H10-188456A has: a first chassis at which the disk table has been arranged; and a second chassis at which the chucking pulley has been arranged, and the disk-like recording medium is conveyed between the first chassis and the second chassis.

A disk-like recording medium (double-sided disk) is stored in a state where a part thereof is exposed to an inside of a disk cartridge, and when recording and reproduction of an information signal to the disk-like recording medium is performed, the disk cartridge is conveyed between the first chassis and the second chassis. Positioning holes for positioning the first chassis and the second chassis are formed in the disk cartridge.

The disk-like recording medium is chucked by the disk table and the chucking pulley, whereby a stable holding state of the disk-like recording medium is secured, the disk-like recording medium is rotated along with rotation of the disk table, and recording and reproduction of the information signal to the disk-like recording medium are performed.

SUMMARY

By the way, it is desirable that in a disk drive apparatus, an air flow around a disk-like recording medium is not made turbulent but is rectified in order to secure a stable rotational state of the disk-like recording medium that is rotated along with rotation of a disk table. When a turbulent flow occurs around the disk-like recording medium, surface shake occurs in a thickness direction at the time of the rotation of the disk-like recording medium, and trouble may arise in recording operation and reproducing operation of an information signal.

Meanwhile, when in the disk drive apparatus as described in JP H10-188456A, provided is a dedicated rectifying plate to rectify the air flow around the disk-like recording medium, the number of components increases, and also a mechanism becomes complicated, thereby causing higher manufacturing cost.

Consequently, it is desirable for a disk drive apparatus according to an embodiment of the present technology to overcome the above-described problems, and to secure the stable rotational state of the disk-like recording medium without causing higher manufacturing cost.

According to an embodiment of the present disclosure, there is provided a disk drive apparatus including a first chassis unit that has a pickup base at which an optical pickup and a disk table have been disposed, and a first base chassis to which the pickup base has been attached, and a second chassis unit that has a second base chassis and at which a chucking pulley has been disposed. A first rectifying plate part is provided at the first base chassis. A second rectifying plate part is provided at the second base chassis. When a disk-like recording medium is conveyed in a space between the first chassis unit and the second chassis unit, at least one of the first chassis unit and the second chassis unit is moved in a thickness direction of the disk-like recording medium, the disk-like recording medium is sandwiched and held by the disk table and the chucking pulley, and also the first rectifying plate part and the second rectifying plate part are located opposed to the disk-like recording medium.

Accordingly, the disk-like recording medium is rotated along with the rotation of the disk table in a state where the first rectifying plate part of the first base chassis and the second rectifying plate part of the second base chassis are located opposed to the disk-like recording medium.

It is preferable that at the second chassis unit, provided is a pickup base at which an optical pickup has been disposed and that has been attached to the second base chassis.

Consequently, it becomes possible to perform recording or reproduction of an information signal to both sides of the disk-like recording medium.

When at least one of the first chassis unit and the second chassis unit may preferably be moved in the thickness direction of the disk-like recording medium, the first base chassis and the second base chassis are connected to each other in the thickness direction of the disk-like recording medium.

Consequently, positioning of the first base chassis and the second base chassis is performed, and relative positions of the first rectifying plate part and the second rectifying plate part become clear.

An outer periphery of the first rectifying plate part may preferably be provided as a first folded part folded to a side of the second base chassis. An outer periphery of the second rectifying plate part may preferably be provided as a second folded part folded to a side of the first base chassis. When at least one of the first chassis unit and the second chassis unit is moved in the thickness direction of the disk-like recording medium, the first folded part and the second folded part may preferably be butted against and connected to each other.

Consequently, an outer peripheral side of the disk-like recording medium is blocked by the first folded part and the second folded part.

The first chassis unit and the second chassis unit may preferably b moved in the thickness direction of the disk-like recording medium.

Consequently, it becomes possible to minimize movement amounts of the first rectifying plate part and the second rectifying plate part in the thickness direction of the disk-like recording medium, respectively.

The first chassis unit and the second chassis unit may preferably be simultaneously moved.

Consequently, the first chassis unit and the second chassis unit are simultaneously moved, and chucking operation of the disk-like recording medium is performed.

Provided are cam sliders that are moved in a predetermined direction and move the first chassis unit and the second chassis unit.

Consequently, the positioning pins are inserted in the positioning holes, and the first pickup base and the second pickup base are positioned.

According to the present technology, since a part of each of the first base chassis and the second base chassis desired to arrange the disk table and the chucking pulley is provided as the first rectifying plate part and the second rectifying plate part, respectively, the stable rotational state of the disk-like recording medium can be secured without causing higher manufacturing cost.

DETAILED DESCRIPTION OF THE EMBODIMENT(S)

Figure 1:
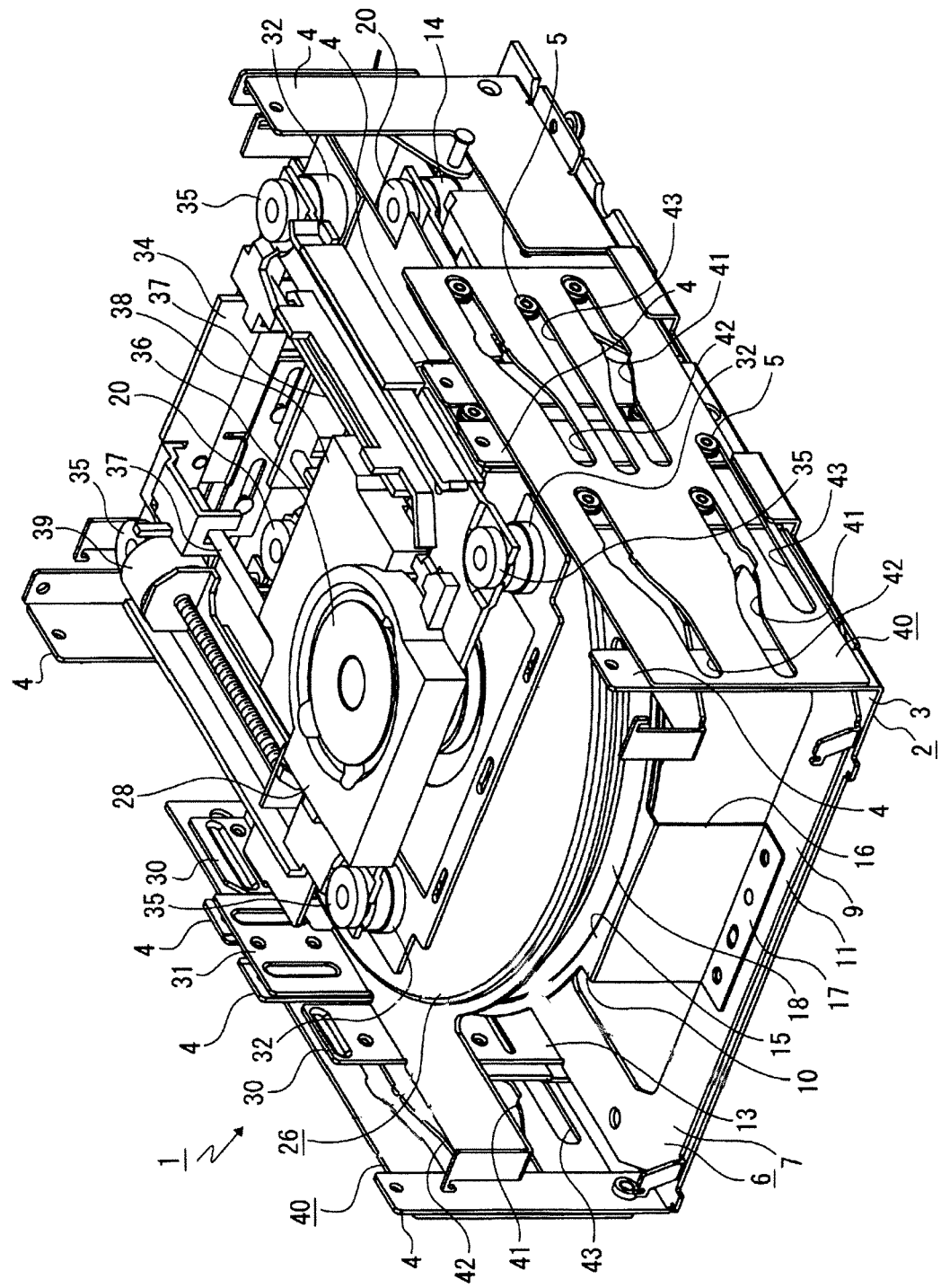
FIG. 1 shows a mode for carrying out a disk drive apparatus according to an embodiment of the present technology together with FIGS. 2 to 17, and the present drawing is a perspective view of the disk drive apparatus.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, an embodiment of a disk drive apparatus of the present technology will be explained according to accompanying drawings.

In the following explanation, a direction where a disk-like recording medium is conveyed toward the disk drive apparatus at the time of loading is set as a rear (a retraction direction), a direction where the disk-like recording medium is conveyed from the disk drive apparatus at the time of ejection is set as a front (discharge direction), and a horizontal direction is indicated in a state when the disk drive apparatus is seen from the front, whereby the front/rear, vertical, and horizontal directions are indicated.

Note that the front/rear, vertical, and horizontal directions indicated hereinafter are for convenience of explanation, and that the carrying out of the present technology is not limited to these directions.

[Configuration of Disk Drive Apparatus]

First, a specific configuration of a disk drive apparatus 1 will be explained (refer to FIGS. 1 to 7).

<Base Frame>

Figure 2:
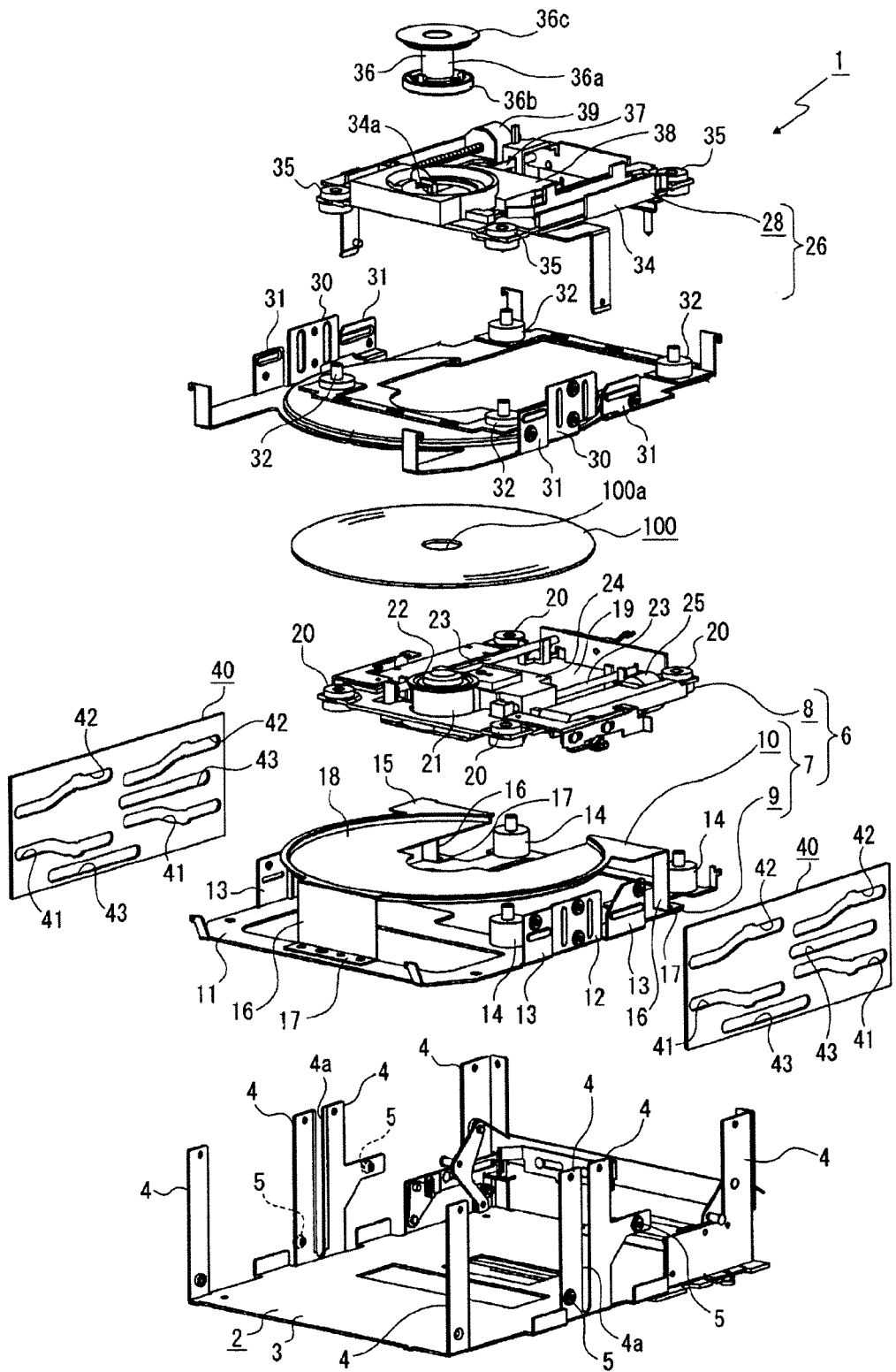
FIG. 2 is an exploded perspective view of the disk drive apparatus.

The disk drive apparatus 1 has: a base frame 2; and a cover to cover the base frame 2 from an upper side, which is not shown, and the base frame 2 has: a bottom surface plate part 3 formed in substantially a rectangle having an elongated outer shape; and a plurality of side surface plate parts 4, 4, . . . projected upward from both right and left edges of the bottom surface plate part 3, respectively (refer to FIGS. 1 and 2).

At both right and left sides of substantially a center in a front/rear direction of the base frame 2, a pair of side surface plate parts 4, 4, . . . are provided side by side at front and rear sides. A slit that is opened upward and vertically extends is formed between these side surface plate parts 4 and 4 aligned at the front and rear sides, and this slit is formed as a guidance restriction hole 4a.

Guidance restriction pins 5, 5, . . . are attached to outer surfaces of the side surface plate parts 4, 4, . . . aligned in pairs at the front and rear sides in substantially the center in the front/rear direction, respectively.

<First Chassis Unit>

A first chassis unit 6 is movably supported in a vertical direction by the side surface plate parts 4, 4 of the base frame 2. The first chassis unit 6 has a first base chassis 7 and a first pickup base 8 (refer to FIGS. 3 and 4).

In the first base chassis 7, a disk plate 10 is connected to a base plate 9.

The base plate 9 has: a base surface part 11 that faces the vertical direction; first side surface parts 12 and 12 projected upward from both right and left edges of the base surface part 11, respectively; and second side surface parts 13, 13, . . . projected upward from both the right and left edges of the base surface part 11, respectively.

The base surface part 11 is formed in an elongated substantially rectangular shape.

The first side surface part 12 is located slightly closer to an inside than the second side surface part 13, and guided pins 12a and 12a are provided at an outer surface of the first side surface part 12 so as to be vertically spaced aside from each other. The guided pins 12a and 12a are vertically slidably engaged with the guidance restriction hole 4a formed between the side surface plate parts 4 and 4 of the base frame 2, and movement to a horizontal direction of the base plate 9 is restricted by the base frame 2.

The second side surface parts 13, 13, . . . are located at front and rear sides sandwiching the first side surface parts 12 and 12, respectively. A guided pin 13*a* is provided at an outer surface of the second side surface part 13.

Upwardly projected four attachment projections 14, 14, . . . are provided on the base surface part 11 so as to be spaced aside from one another in all directions.

The disk plate 10 includes: an upper surface plate part 15 that faces the vertical direction; coupling plate parts 16, 16, and 16 respectively projected downward from an outer periphery of the upper surface plate part 15; and attached plate parts 17, 17, and 17 provided continuously with lower ends of the coupling plate parts 16, 16, and 16. A first rectifying plate part 18 formed having a circular arc outer shape is provided at the upper surface plate part 15, and an outer periphery of the first rectifying plate part 18 is provided as an upwardly folded first folded part 18*a*. A transmission notch 18*b* is formed at a position from the outer periphery to a center of the first rectifying plate part 18.

In the disk plate 10, the attached plate parts 17, 17, and 17 are attached to the outer periphery of the base surface part 11, and are connected to the base plate 9. In a state where the disk plate 10 has been connected to the base plate 9, the upper surface plate part 15 is located in a state of being parallel to the base surface part 11.

The first pickup base 8 is attached to the base surface part 11 of the base plate 9 through the attachment projections 14, 14, . . . . Desired each part of the first pickup base 8 is arranged at an arrangement plate 19.

The arrangement plate 19 is formed in an elongated substantially rectangular shape, and insulators 20, 20, . . . are connected to four corners thereof. The insulators 20, 20, . . . are attached to the attachment projections 14, 14, . . . , respectively, and thereby the first pickup base 8 is connected to the first base chassis 7. The first pickup base 8 is located below the first rectifying plate part 18 of the disk plate 10 in a state of being connected to the first base chassis 7.

A spindle motor 21 is arranged at one end in a longitudinal direction of the arrangement plate 19, and a disk table 22 is coupled to an output shaft of the spindle motor 21. Accordingly, the disk table 22 is rotated by a drive force of the spindle motor 21. An outer periphery of the disk table 22 is provided as a table part 22*a*, and an inside portion of the table part 22*a* is provided as an upwardly projected centering projection 22*b*.

Guide shafts 23 and 23 that extend in the longitudinal direction are arranged at the arrangement plate 19 so as to be spaced aside from each other at right and left sides. A first optical pickup 24 is movably supported by the guide shafts 23 and 23.

A drive motor 25 is arranged at the arrangement plate 19. The drive motor 25 has a lead screw that extends in the front/rear direction, and the lead screw is screwed to a part of the first optical pickup 24. Accordingly, the first optical pickup 24 is guided by the guide shafts 23 and 23 by means of a drive force of the drive motor 25, and is moved in a direction contacted and separated with/from the disk table 22 (in the front/rear direction). When the first optical pickup 24 is moved, a light emitted from the first optical pickup 24 to a disk-like recording medium 100 is irradiated to the disk-like recording medium 100 through the transmission notch 18*b* formed at the first rectifying plate part 18.

<Second Chassis Unit>

Figure 3:
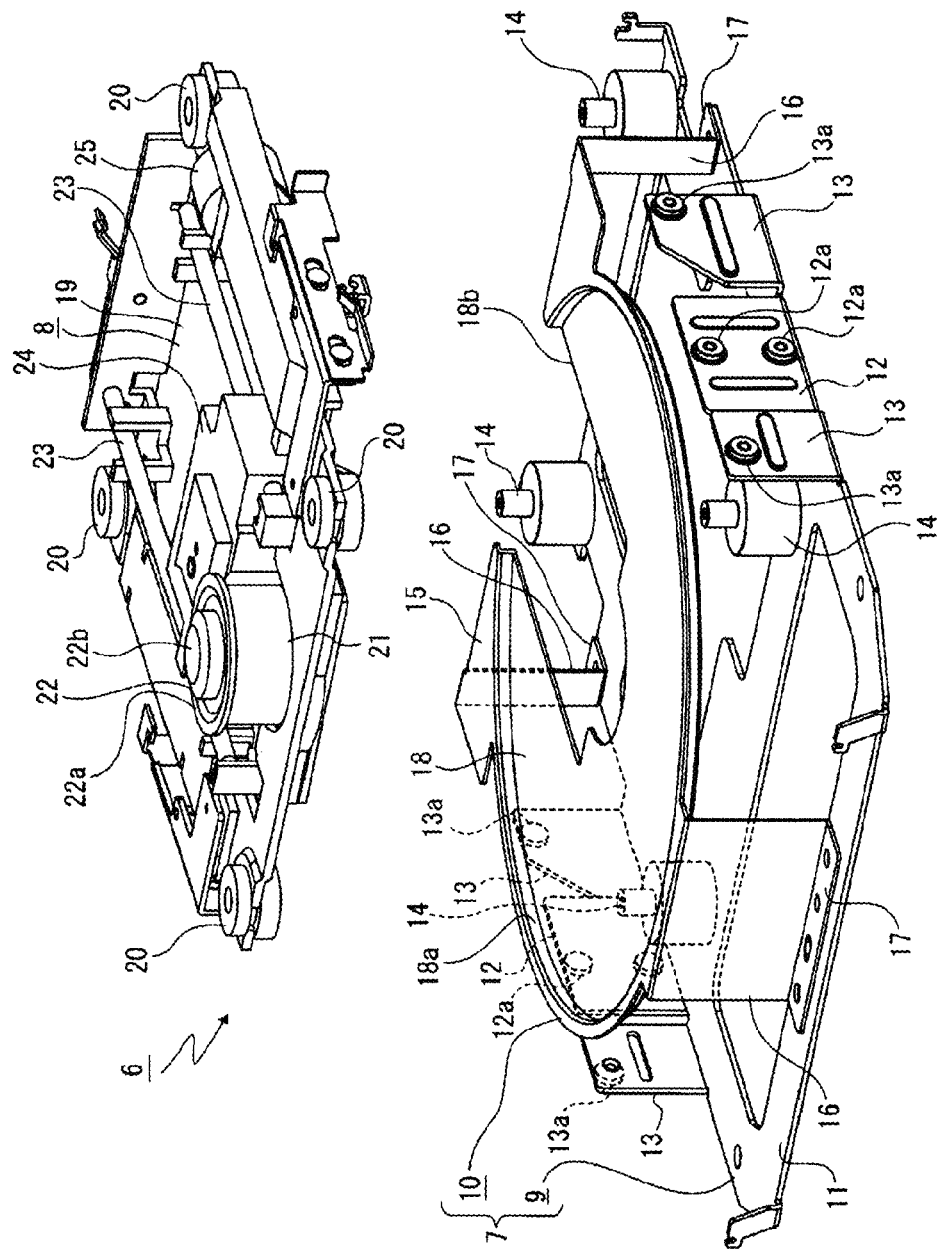
FIG. 3 is an exploded perspective view of a first chassis unit.
Figure 4:
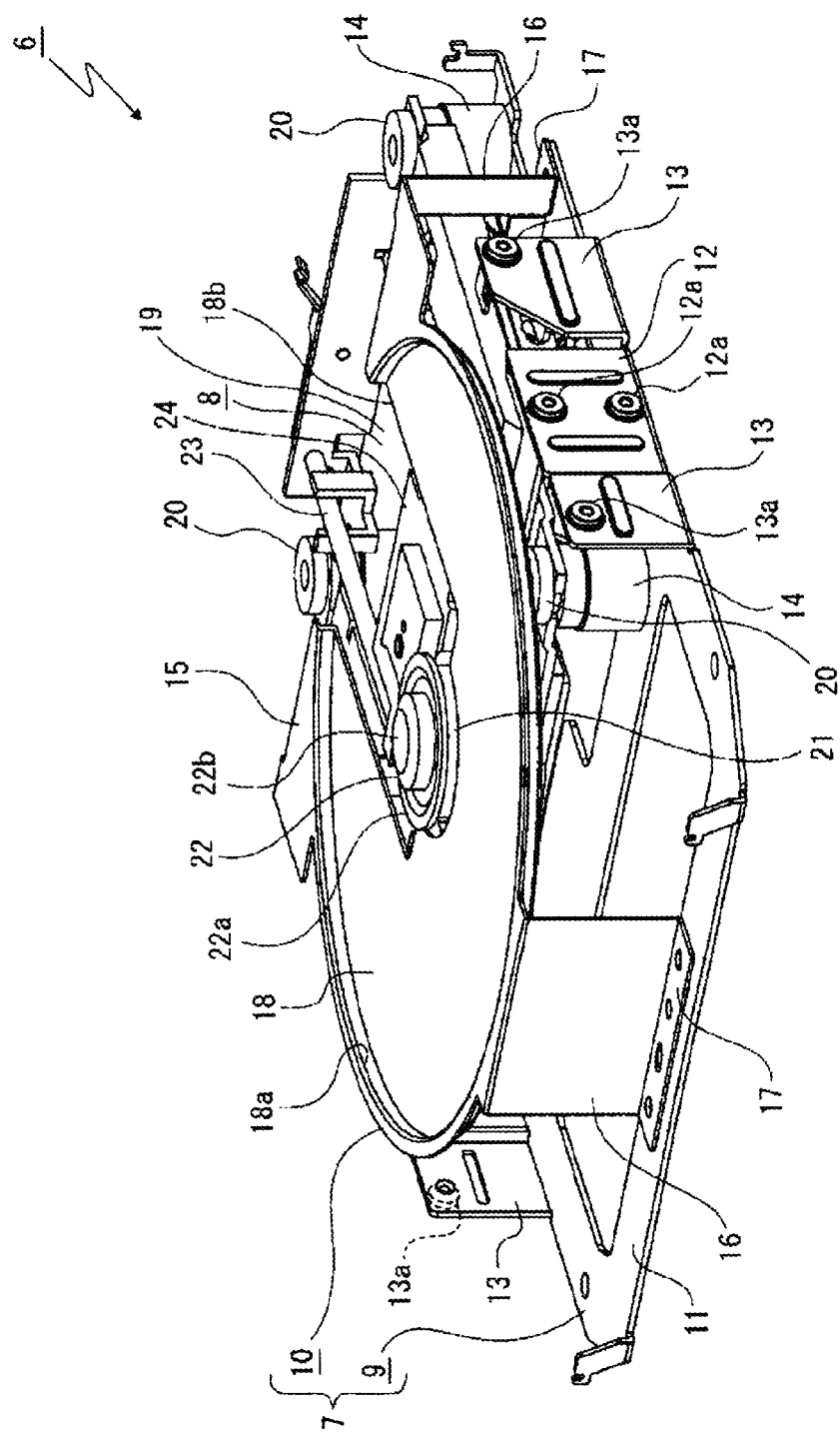
FIG. 4 is a perspective view of the first chassis unit.
Figure 5:
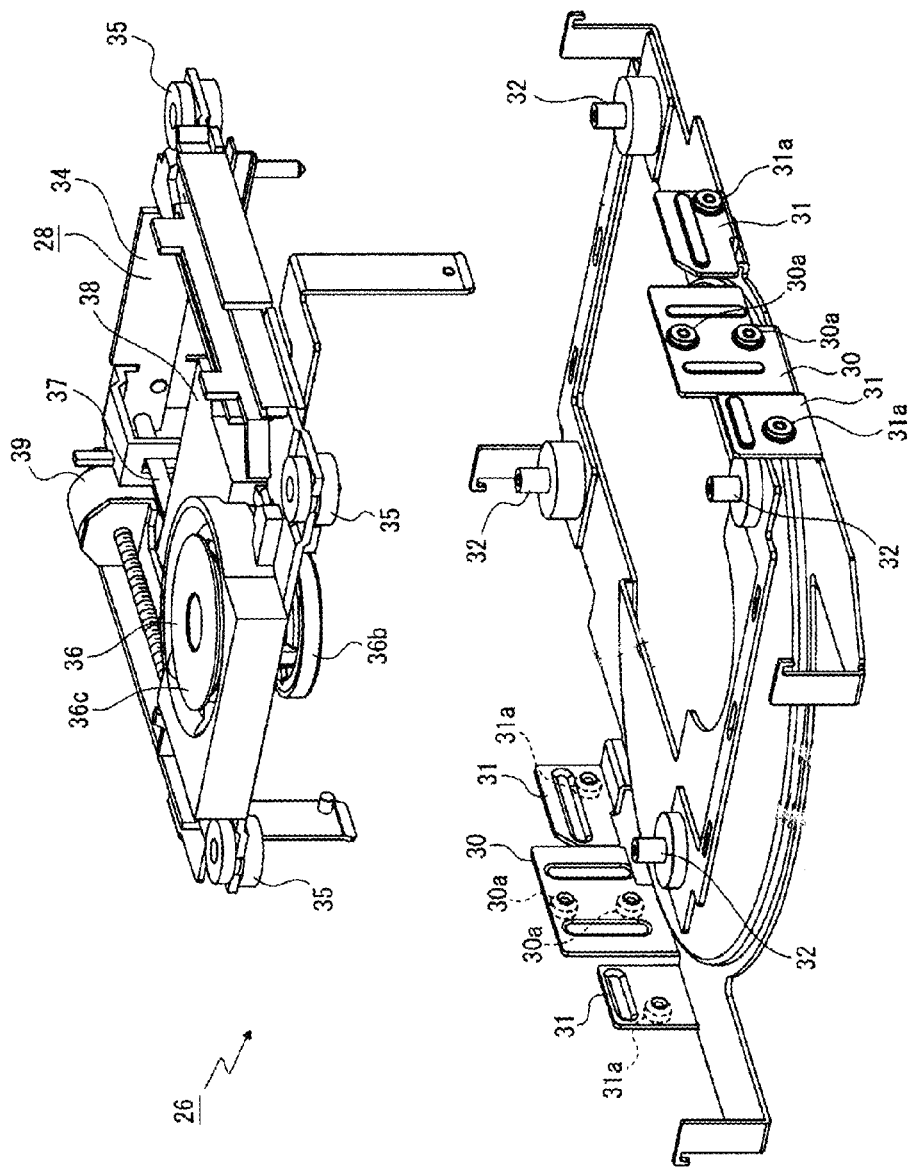
FIG. 5 is an exploded perspective view of a second chassis unit.
Figure 6:
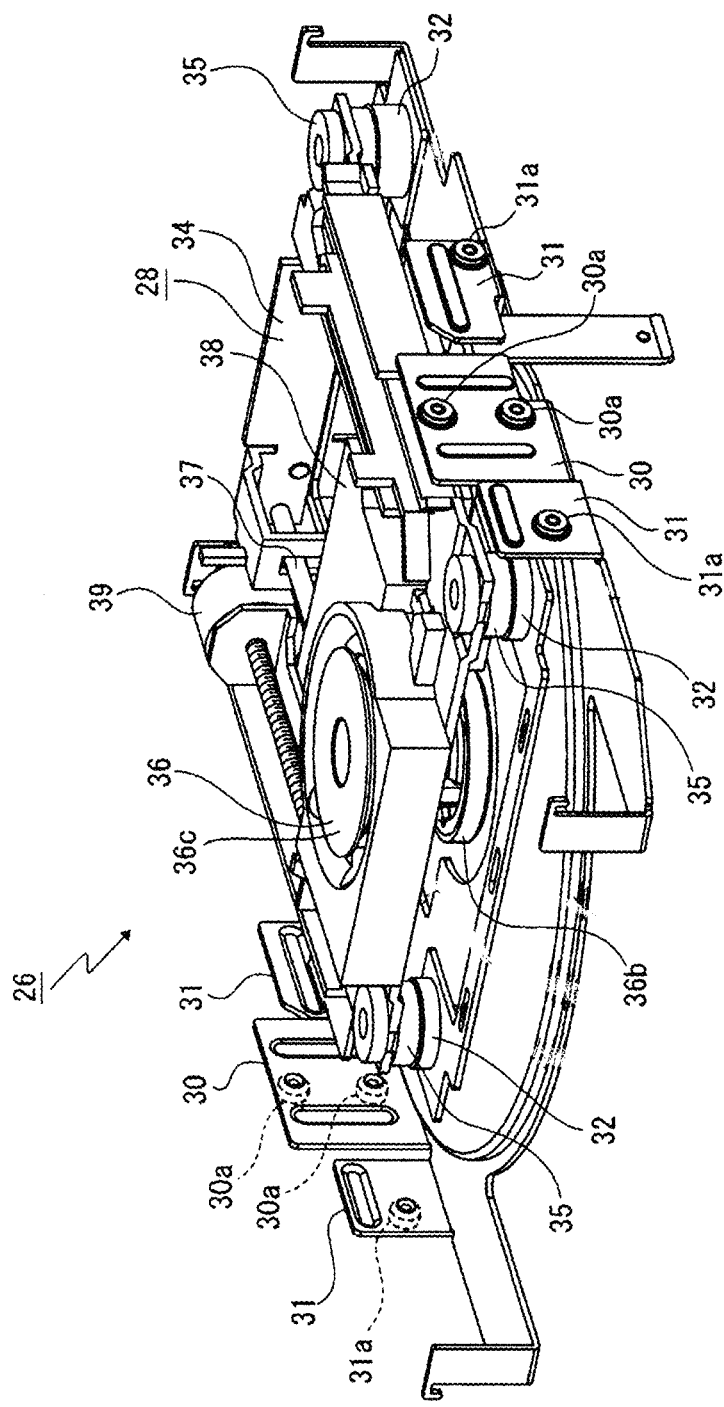
FIG. 6 is a perspective view of the second chassis unit.

A second chassis unit 26 is supported movably in the vertical direction above the first chassis unit 6 by the side surface plate parts 4, 4, . . . of the base frame 2 (refer to FIGS. 2 and 3). The second chassis unit 26 has a second base chassis and a second pickup base 28 (refer to FIGS. 5 and 6).

The second base chassis has: a base surface part formed in an elongated substantially rectangular shape; first side surface parts 30 and 30 projected upward from both right and left edges of the base surface part, respectively; and second side surface parts 31, 31, . . . projected upward from both the right and left edges of the base surface part, respectively.

A vertically penetrated transmission hole is formed in the base surface part.

The first side surface part 30 is located slightly closer to an inside than the second side surface part 31, and guided pins 30*a* and 30*a* are provided at an outer surface of the first side surface part 30 so as to be vertically spaced aside from each other. The guided pins 30*a* and 30*a* are vertically slidably engaged with the guidance restriction hole 4*a* formed between the side surface plate parts 4 and 4 of the base frame 2, and movement to the horizontal direction of the second base chassis is restricted by the base frame 2.

The second side surface parts 31, 31, . . . are located at front and rear sides sandwiching the first side surface parts 30 and 30, respectively. A guided pin 31*a* is provided at an outer surface of the second side surface part 31.

Upwardly projected four attachment projections 32, 32, . . . are provided on the base surface part so as to be spaced aside from one another in all directions.

A part of the second base chassis is provided as a second rectifying plate part, and the second rectifying plate part is a portion located right above the first rectifying plate part 18 of the first base chassis 7. A part of the transmission hole is located also in the second rectifying plate part. An outer periphery of the second rectifying plate part is provided as a downwardly folded second folded part.

The second pickup base 28 is attached to the base surface part of the second base chassis through the attachment projections 32, 32, . . . . Desired each part of the second pickup base 28 is arranged at an arrangement plate 34.

The arrangement plate 34 is formed in an elongated substantially rectangular shape, and insulators 35, 35, . . . are connected to four corners thereof. The insulators 35, 35, . . . are attached to the attachment projections 32, 32, . . . , respectively, and thereby the second pickup base 28 is connected to the second base chassis. The second pickup base 28 is located above the second rectifying plate part of the second base chassis in a state of being connected to the second base chassis.

A vertically penetrated support hole 34*a* is formed in one end in a longitudinal direction of the arrangement plate 34. A chucking pulley 36 is rotatably supported by the support hole 34*a*.

The chucking pulley 36 has: a shaft part 36*a* that vertically extends; a clamp part 36*b* overhung outward from a lower end of the shaft part 36*a*; and a flange part 36*c* overhung outward from an upper end of the shaft part 36*a*. The chucking pulley 36 is supported by the second pickup base 28 movably in the vertical direction and rotatably in a shaft rotation direction in a state where the shaft part 36*a* is inserted in the support hole 34*a*. An outer diameter of the flange part 36*c* is made larger than a diameter of the support hole 34*a*, and thereby the chucking pulley 36 is prevented from falling off from the second pickup base 28.

Guide shafts 37 and 37 that extend in the longitudinal direction are arranged at the arrangement plate 34 so as to be spaced aside from each other at right and left sides. A second optical pickup 38 is movably supported by the guide shafts 37 and 37.

A drive motor 39 is arranged at the arrangement plate 34. The drive motor 39 has a lead screw that extends in the front/rear direction, and the lead screw is screwed to a part of the second optical pickup 38. Accordingly, the second optical pickup 38 is guided by the guide shafts 37 and 37 by means of a drive force of the drive motor 39, and is moved in a direction contacted and separated with/from the chucking pulley 36 (in the front/rear direction). When the second optical pickup 38 is moved, a light emitted from the second optical pickup 38 to the disk-like recording medium 100 is irradiated to the disk-like recording medium 100 through the transmission hole formed in the base surface part of the second base chassis.

<Cam Slider>

Cam sliders 40 and 40 are movably supported in the front/rear direction by the side surface plate parts 4, 4, . . . of the base frame 2, respectively (refer to FIGS. 1 and 2). The cam slider 40 is formed in a plate shape that faces the horizontal direction, and is moved in the front/rear direction by a drive mechanism, which is not shown.

Figure 7:
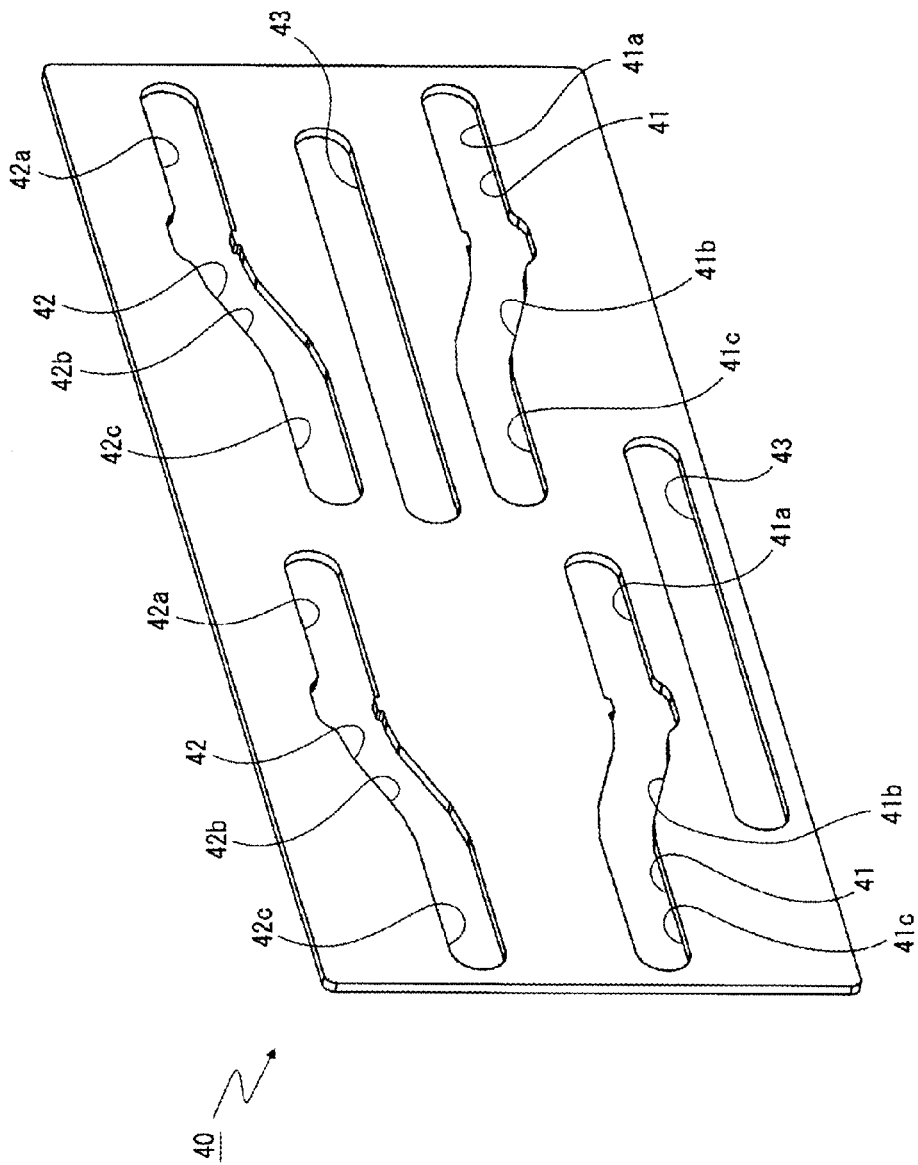
FIG. 7 is a perspective view of a cam slider.

First cam holes 41 and 41 are formed in the cam slider 40 so as to be spaced aside from each other at front and rear sides (refer to FIG. 7). The first cam hole 41 includes: a rear cam part 41a that extends in the front/rear direction; an inclined cam part 41b that is continuous with a front end of the rear cam part 41a and is displaced more upward toward the front; and a front cam part 41c that is continuous with a front end of the inclined cam part 41b and extends in the front/rear direction.

In the cam slider 40, second cam holes 42 and 42 are formed above the first cam holes 41 and 41, respectively so as to be spaced aside from each other at front and rear sides. The second cam hole 42 includes: a rear cam part 42a that extends in the front/rear direction; an inclined cam part 42b that is continuous with a front end of the rear cam part 42a and is displaced more downward toward the front; and a front cam part 42c that is continuous with a front end of the inclined cam part 42b and extends in the front/rear direction.

In the cam slider 40, guided holes 43 and 43 that extend in the front/rear direction are formed at a lower side of the front first cam hole 41 and an upper side of the rear first cam hole 41, respectively.

The guidance restriction pins 5 and 5 of the base frame 2 are inserted in the guided holes 43 and 43, respectively, and thereby the cam slider 40 is supported movably in the front/rear direction with respect to the base frame 2.

The guided pins 13a and 13a of the first chassis unit 6 are slidably engaged with the first cam holes 41 and 41 of the cam slider 40, respectively, and the first chassis unit 6 is supported movably in the vertical direction by the cam sliders 40 and 40.

The guided pins 31a and 31a of the second chassis unit 26 are slidably engaged with the second cam holes 42 and 42 of the cam slider 40, respectively, and the second chassis unit 26 is supported movably in the vertical direction by the cam sliders 40 and 40.

Accordingly, when the cam sliders 40 and 40 are moved in the front/rear direction, the guided pins 12a and 12a are guided to the guidance restriction hole 4a of the base frame 2, the guided pins 13a and 13a are slid in the first cam holes 41 and 41 of the cam slider 40 and the first chassis unit 6 is moved in the vertical direction, and also the guided pins 31a and 31a are slid in the second cam holes 42 and 42 of the cam slider 40 and the second chassis unit 26 is moved in the vertical direction.

[Operation of Disk Drive Apparatus]

Hereinafter, will be explained operation of the disk drive apparatus 1 to the disk-like recording medium 100 at the time of chucking (refer to FIGS. 8 to 17).

<Outline of Operation>

First, an outline of operation relating to chucking operation will be explained.

The disk-like recording medium 100 is ejected from a disk cartridge, which is not shown, is conveyed in a retraction direction (rearward) to a chucking position in the disk drive apparatus 1 by loading operation of a conveyance device, which is not shown, and is chucked at the chucking position, and recording or reproduction of an information signal is performed. In addition, when recording or reproduction of the information signal is ended, chucking of the disk-like recording medium 100 is released, and the disk-like recording medium 100 is conveyed in a discharge direction (forward) by eject operation of the conveyance device and is stored in the disk cartridge.

Note that conveyance of the disk-like recording medium 100 is, for example, performed in a state where the disk-like recording medium 100 is held by a disk holding part provided at a conveyance device.

<Initial State>

Figure 8:
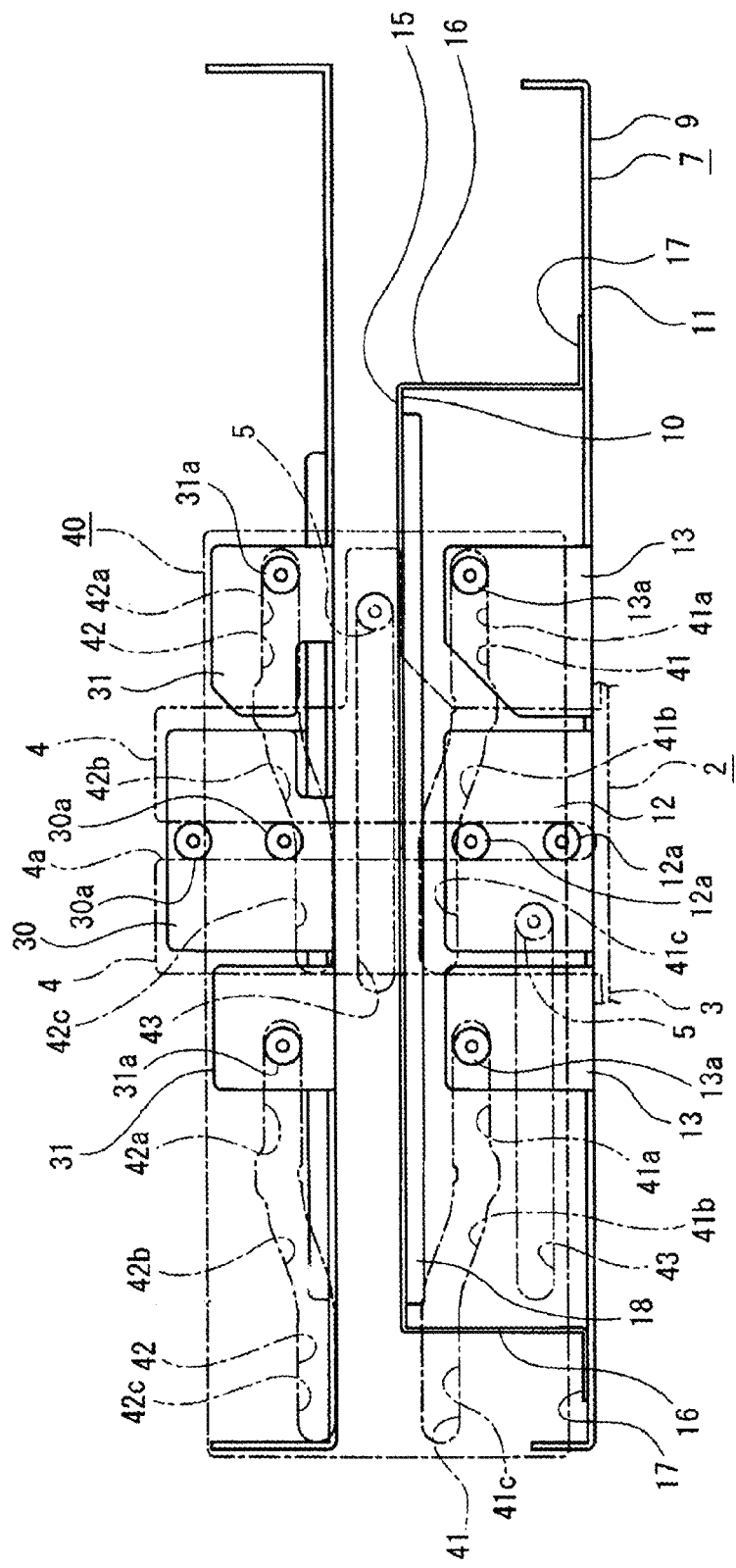
FIG. 8 shows operation of the disk drive apparatus together with FIGS. 9 to 17, and the present figure is a schematic side view showing an initial state.
Figure 9:
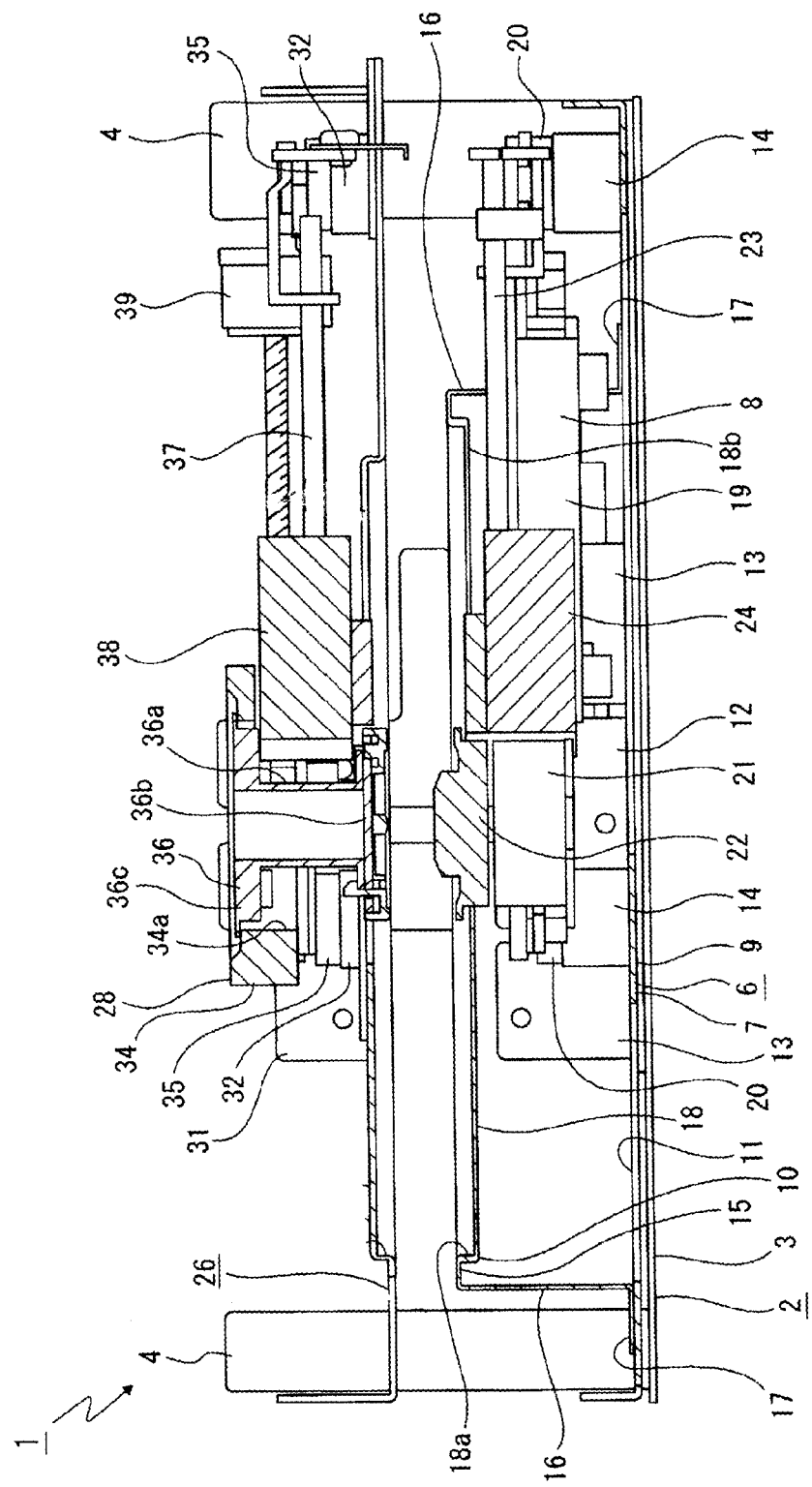
FIG. 9 is a schematic cross-sectional view showing the initial state.

Next, will be explained an initial state of each part in the disk drive apparatus 1 at the time of chucking operation (refer to FIGS. 8 to 10).

The cam sliders 40 and 40 are held at front movable ends, respectively. At this time, the guidance restriction pins 5 and 5 of the base frame 2 are engaged with rear ends of the guided holes 43 and 43 in the cam slider 40, respectively. In addition, the guided pins 13a and 13a of the first chassis unit 6 are engaged with rear ends of the rear cam parts 41a and 41a of the first cam holes 41 and 41 in the cam slider 40, respectively, and the guided pins 31a and 31a of the second chassis unit 26 are engaged with rear ends of the rear cam parts 42a and 42a of the second cam holes 42 and 42 in the cam slider 40, respectively.

Accordingly, the first chassis unit 6 is held at a lower movable end, and the second chassis unit 26 is held at an upper movable end. The first chassis unit 6 is held at the lower movable end, and the second chassis unit 26 is held at the upper movable end, whereby the first rectifying plate part 18 of the first base chassis 7 and the second rectifying plate part of the second base chassis are located most spaced aside from each other in the vertical direction (refer to FIGS. 8 and 9). In addition, the disk table 22 and the chucking pulley 36 are located most spaced aside from each other in the vertical direction.

<Chucking Operation>

Figure 10:
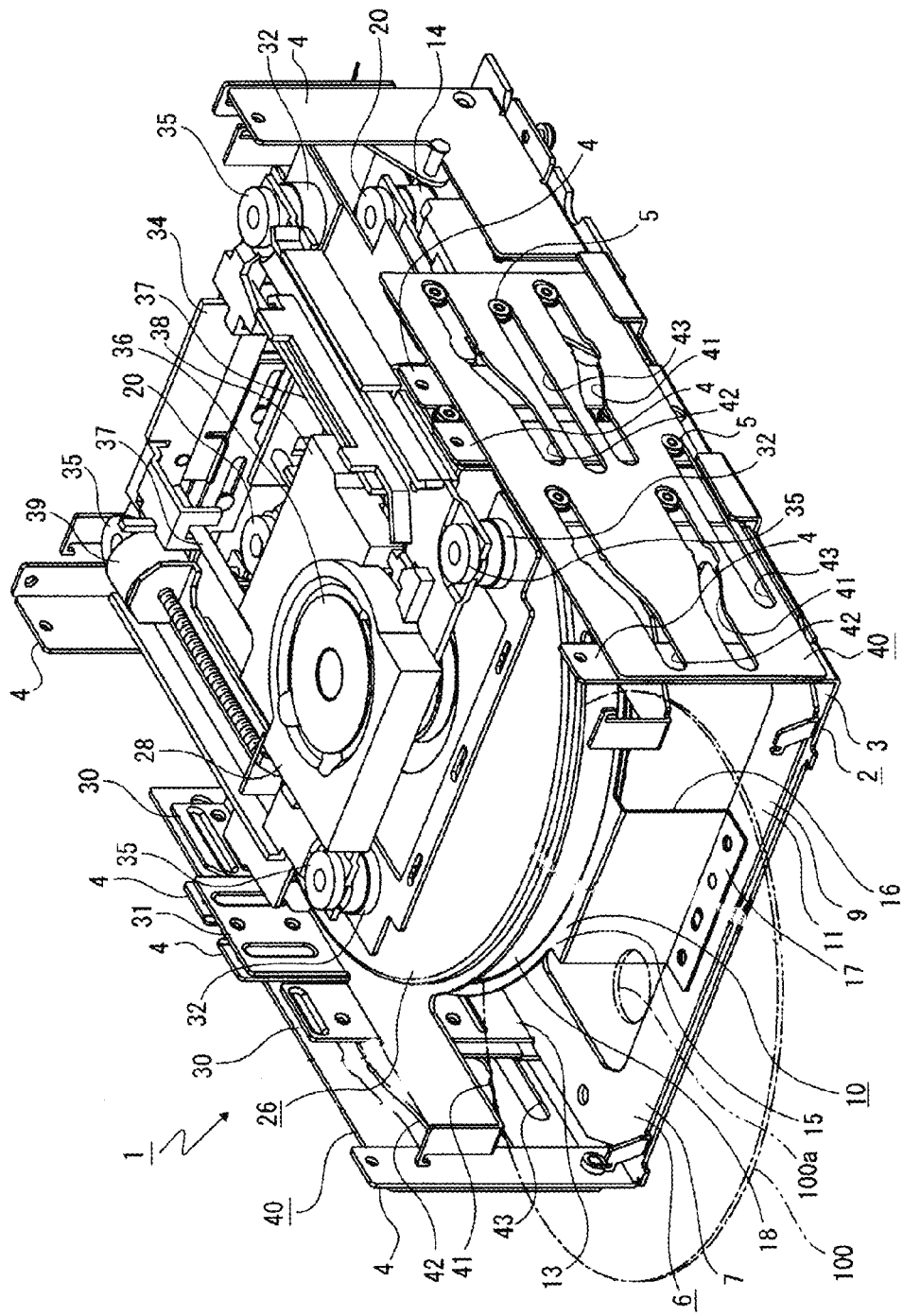
FIG. 10 is a perspective view showing a state where a disk-like recording medium has been conveyed in the initial state.
Figure 11:
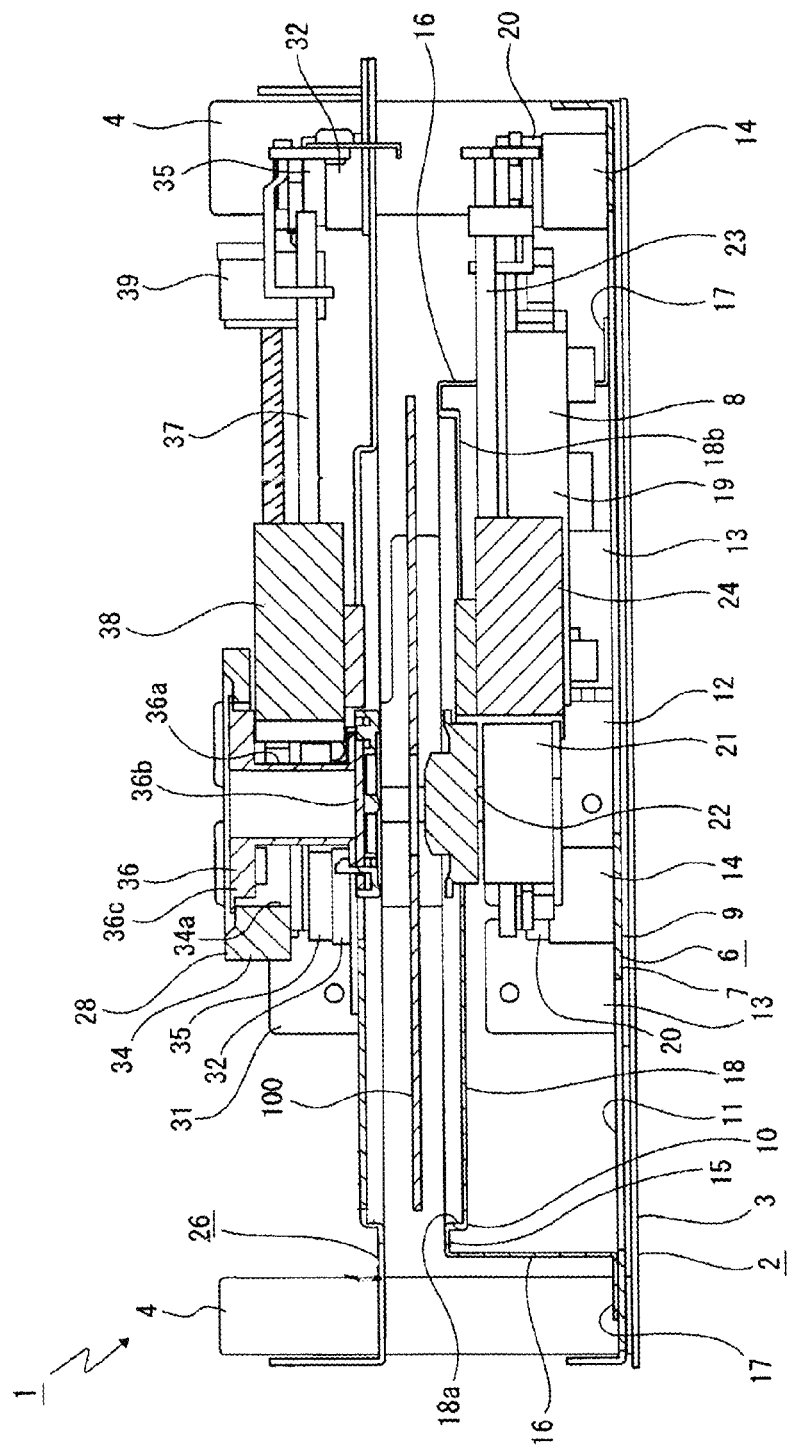
FIG. 11 is a schematic cross-sectional view showing a state where the disk-like recording medium has been conveyed to a chucking position.

The disk-like recording medium 100 is ejected from the disk cartridge, and is conveyed in the retraction direction (rearward) by the loading operation of the conveyance device (refer to FIG. 10). The disk-like recording medium 100 is conveyed to a chucking position where a center of a center hole 100a coincides with a center axis of the disk table 22 and a center axis of the chucking pulley 36 (refer to FIG. 11).

In a state where the disk-like recording medium 100 has been conveyed to the chucking position, the disk-like recording medium 100 is located right above the first rectifying plate part 18 of the first chassis unit 6, and is also located right under the second rectifying plate part of the second chassis unit 26. At this time, the disk-like recording medium 100 is held by the disk holding part of the conveyance device.

When the disk-like recording medium 100 is conveyed to the chucking position, the cam sliders 40 and 40 are synchronously moved rearward by the drive mechanism. Since the guidance restriction pins 5 and 5 of the base frame 2 are engaged with the guided holes 43 and 43, respectively, the cam slider 40 is guided by the guidance restriction pins 5 and 5, and is moved rearward.

Figure 12:
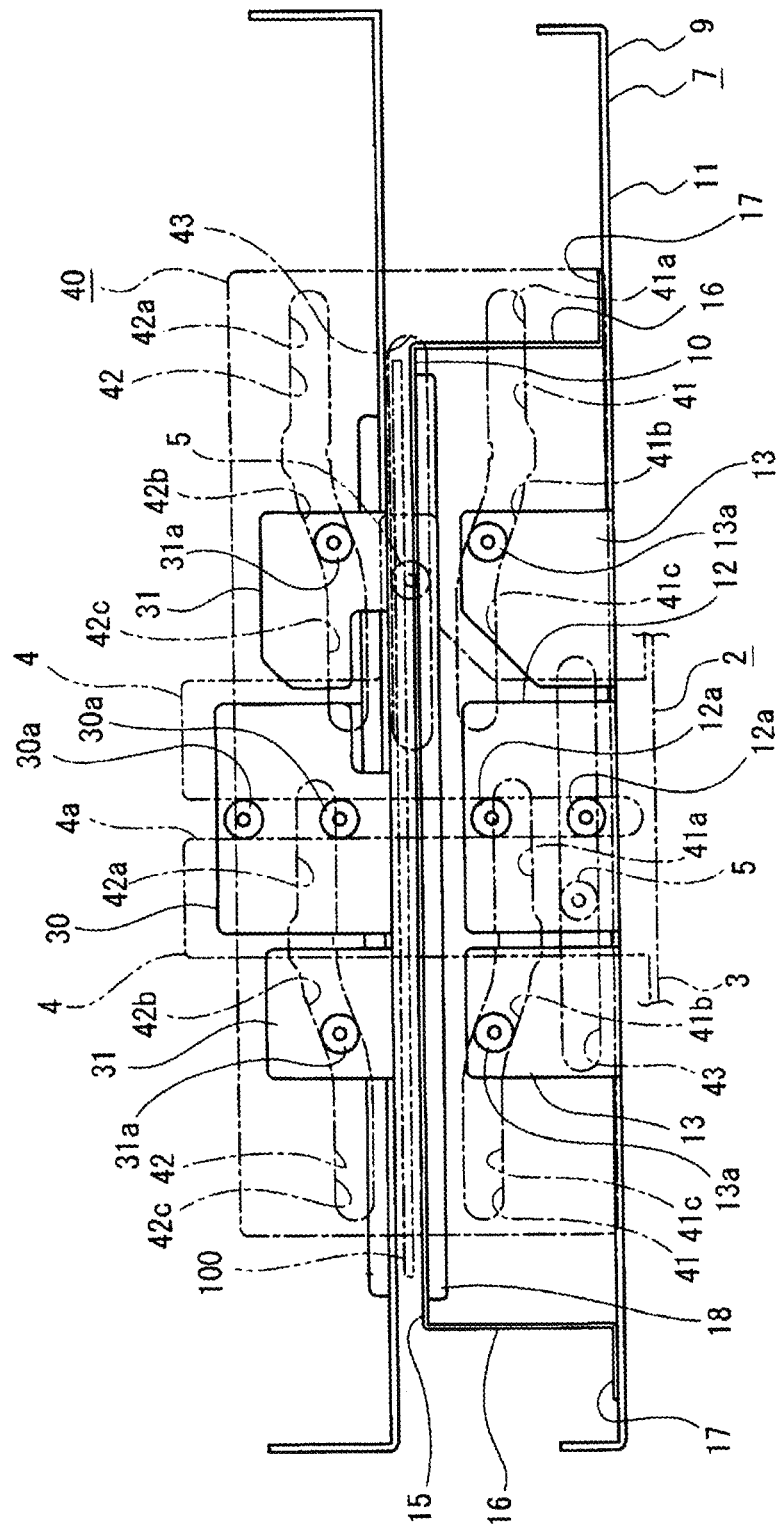
FIG. 12 is a schematic side view showing a half-way state where the first chassis unit and the second chassis unit are moved in a vertical direction.
Figure 13:
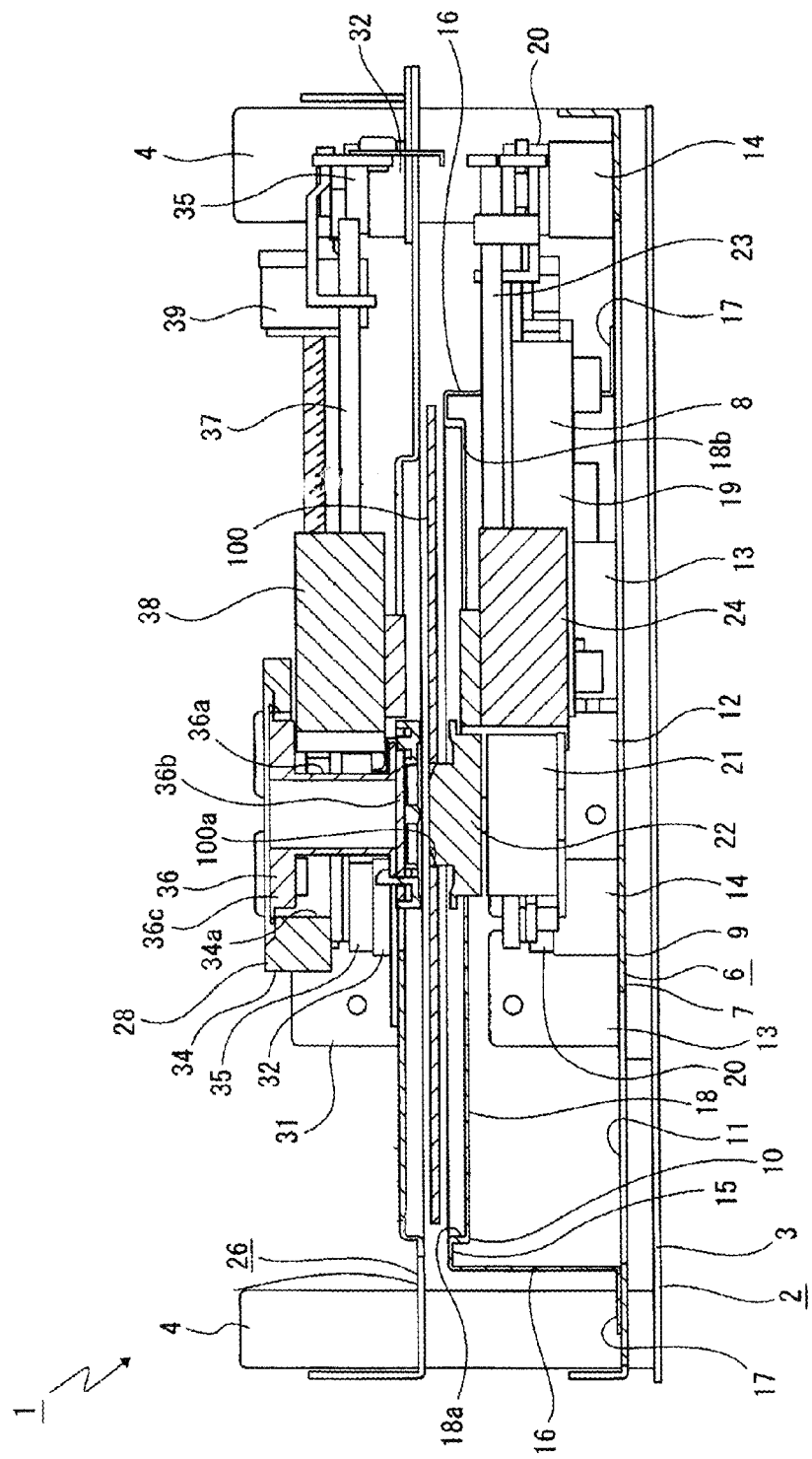
FIG. 13 is a schematic cross-sectional view showing the half-way state where the first chassis unit and the second chassis unit are moved in the vertical direction.

When the cam slider 40 is moved rearward, the guided pins 13a and 13a of the first chassis unit 6 are slid from the rear cam parts 41a and 41a toward the inclined cam parts 41b and 41b of the first cam holes 41 and 41, respectively, and also the guided pins 31a and 31a of the second chassis unit 26 are slid from the rear cam parts 42a and 42a toward the inclined cam parts 42b and 42b of the second cam holes 42 and 42, respectively (refer to FIG. 12). Accordingly, the first chassis unit 6 is moved upward and also the second chassis unit 26 is moved downward, the first rectifying plate part 18 of the first chassis unit 6 and the second rectifying plate part of the second chassis unit 26 approach to each other, and also the disk table 22 and the chucking pulley 36 approach to each other (refer to FIG. 13).

The disk table 22 and the chucking pulley 36 approach to each other, and thereby the centering projection 22b of the disk table 22 is inserted in the center hole 100a of the disk-like recording medium 100 from a lower side. When the centering projection 22b of the disk table 22 is inserted in the center hole 100a of the disk-like recording medium 100, holding of the disk-like recording medium 100 by the disk holding part is released, and the disk holding part is, for example, retracted outside outer peripheries of the first rectifying plate part 18 and the second rectifying plate part.

Figure 14:
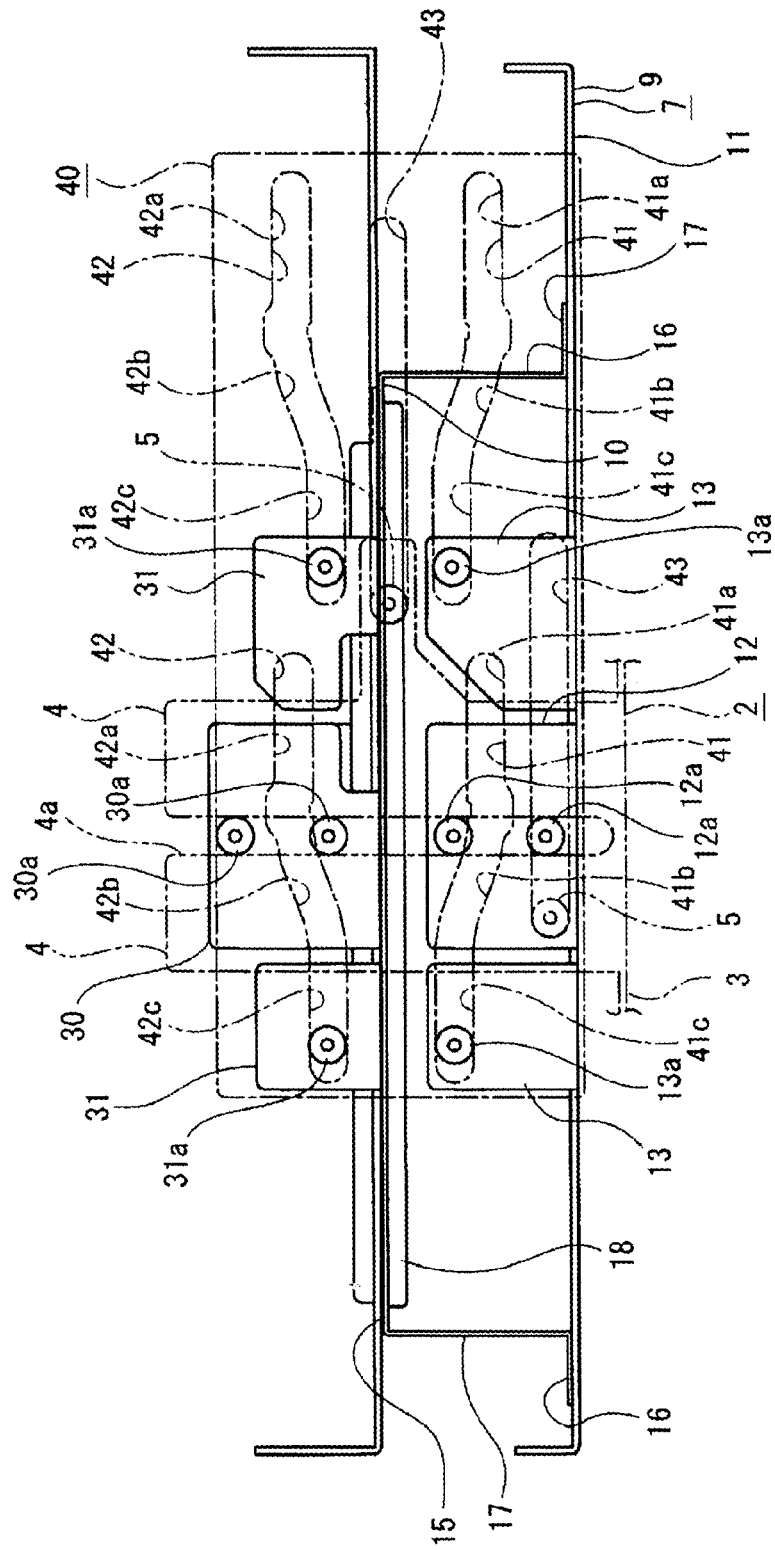
FIG. 14 is a schematic side view showing a state where the first chassis unit and the second chassis unit have been moved in the vertical direction, and where a first rectifying plate part and a second rectifying plate part have been connected to each other.
Figure 15:
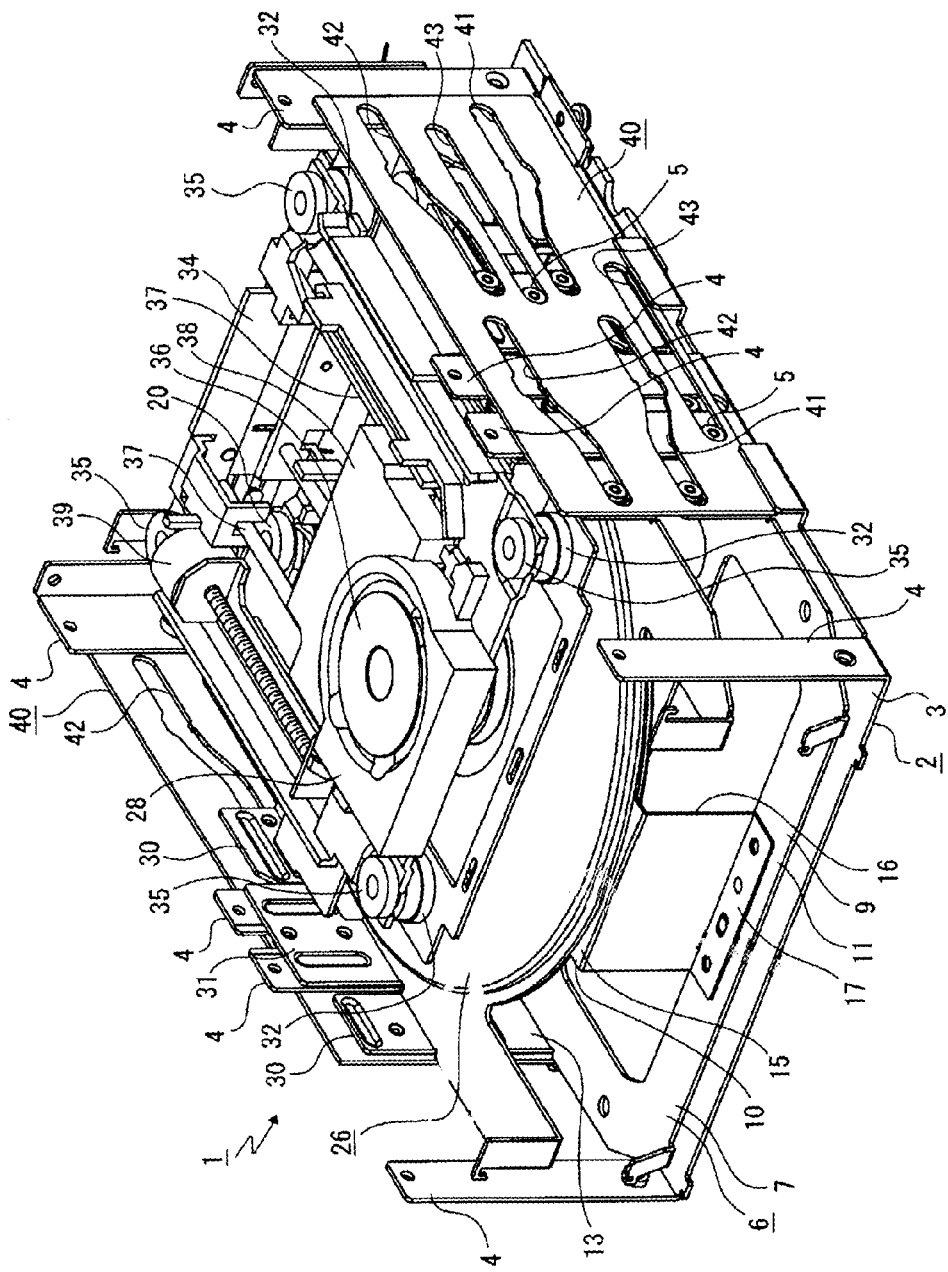
FIG. 15 is a perspective view showing a state where the first chassis unit and the second chassis unit have been moved in the vertical direction, and where the first rectifying plate part and the second rectifying plate part have been connected to each other.

The cam sliders 40 and 40 are continuously moved rearward, the guided pins 13a and 13a of the first chassis unit 6 are slid from the inclined cam parts 41b and 41b to front ends of the front cam parts 41c and 41c of the first cam holes 41 and 41, respectively, and also the guided pins 31a and 31a of the second chassis unit 26 are slid from the inclined cam parts 42b and 42b to front ends of the front cam parts 42c and 42c of the second cam holes 42 and 42, respectively (refer to FIGS. 14 and 15). Accordingly, the first chassis unit 6 is moved further upward and also the second chassis unit 26 is moved further downward, and the first rectifying plate part 18 of the first chassis unit 6 and the second rectifying plate part of the second chassis unit 26 further approach to each other, and also the disk table 22 and the chucking pulley 36 further approach to each other (refer to FIG. 16).

Figure 16:
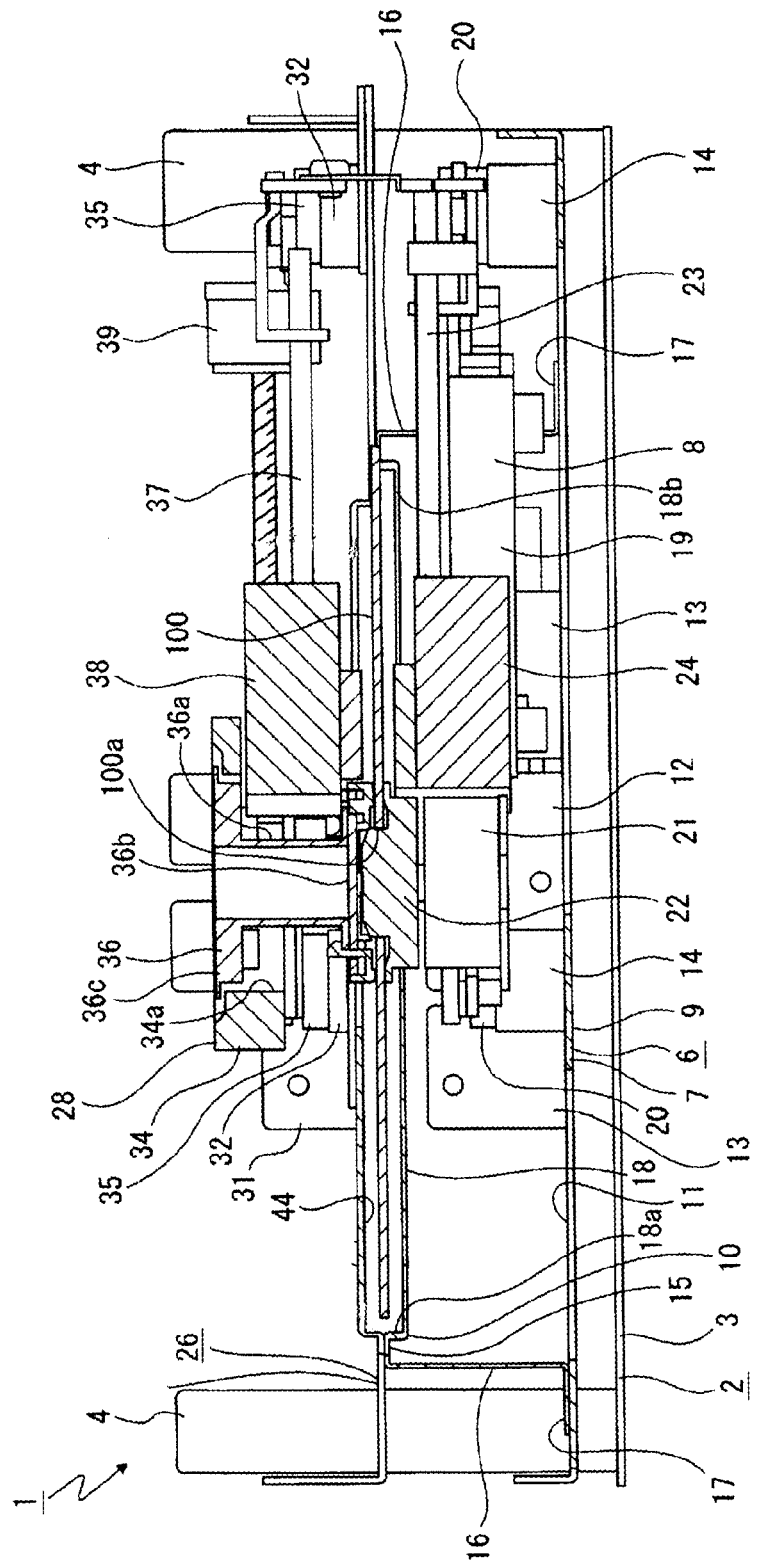
FIG. 16 is a schematic enlarged cross-sectional view showing a state where the first chassis unit and the second chassis unit have been moved in the vertical direction, and where the disk-like recording medium has been chucked.
Figure 17:
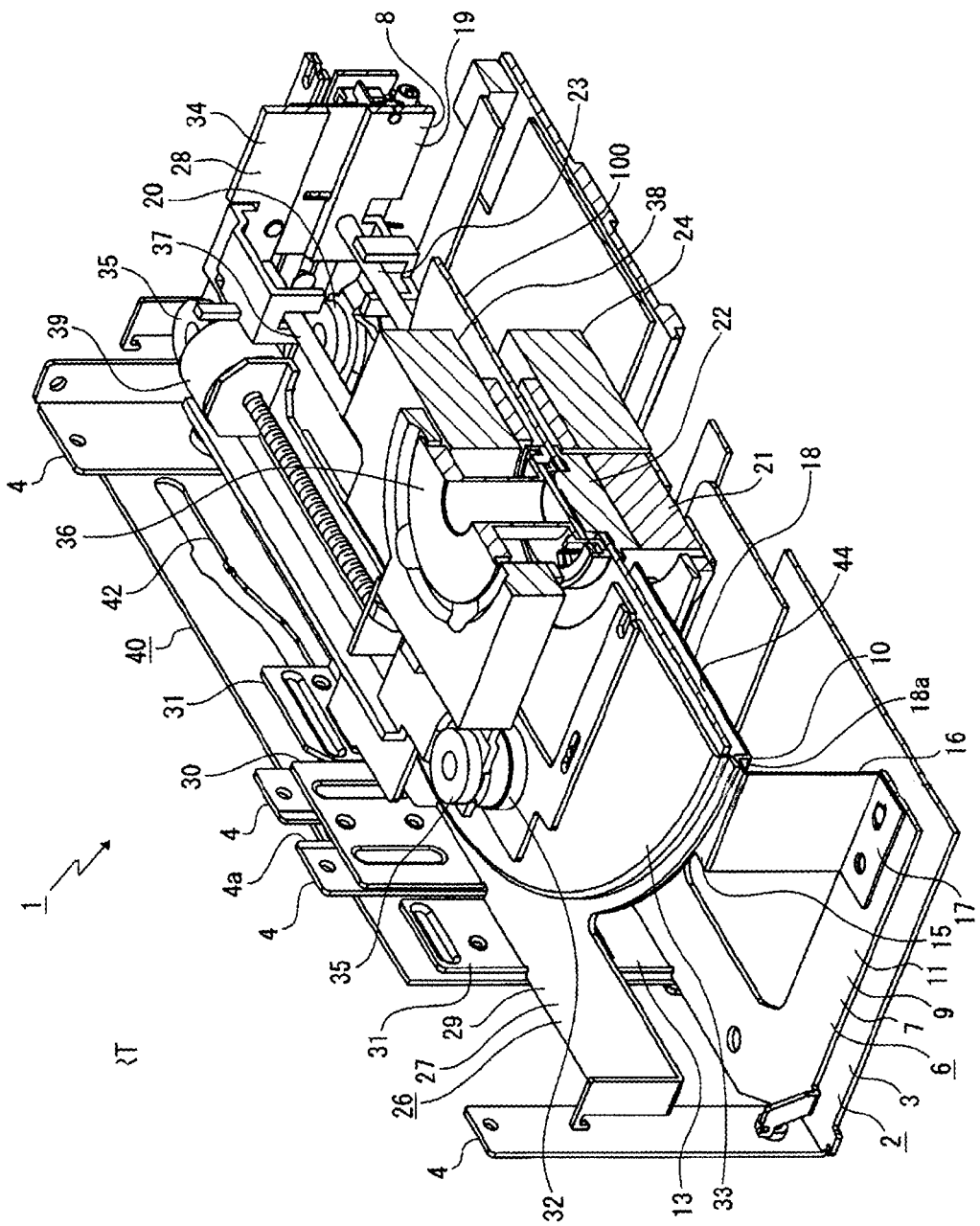
FIG. 17 is a perspective view showing as a cross section a part of the state where the first chassis unit and the second chassis unit have been moved in the vertical direction, and where the first rectifying plate part and the second rectifying plate part have been connected to each other.

As described above, the disk table 22 and the chucking pulley 36 approach to each other, and thereby the disk-like recording medium 100 is sandwiched and chucked by both thereof (refer to FIGS. 16 and 17). When the disk-like recording medium 100 is chucked, rearward movement of the cam sliders 40 and 40 is stopped. Note that for example, a metal plate provided at the disk table 22, which is not shown, is attracted by a magnet provided at the chucking pulley 36, which is not shown through an inner periphery of the disk-like recording medium 100, and that thereby the inner periphery of the disk-like recording medium 100 is sandwiched and chucked by the table part 22a of the disk table 22 and the clamp part 36b of the chucking pulley 36.

In a state where chucking of the disk-like recording medium 100 has been performed, an upper end of the first folded part 18a in the first rectifying plate part 18 and a lower end of the second folded part in the second rectifying plate part are butted against each other, and thereby the first base chassis 7 and the second base chassis are connected to each other.

An upper end of the first folded part 18a and a lower end of the second folded part are butted against each other, whereby a housing space 44 is formed inside the first rectifying plate part 18 and the second rectifying plate part by the first rectifying plate part 18 and the second rectifying plate part, and the disk-like recording medium 100 is stored in the housing space 44. At this time, the first rectifying plate part 18 is located at the disk-like recording medium 100 so as to be opposed to a lower surface and also the second rectifying plate part is located so as to be opposed to an upper surface, and a constant gap exists between the lower surface of the disk-like recording medium 100 and the first rectifying plate part 18 and also a constant gap exists between the upper surface of the disk-like recording medium 100 and the second rectifying plate part. These gaps are, for example, all made as approximately 2 mm.

As described above, when the disk-like recording medium 100 is chucked, the disk table 22 is rotated by the drive force of the spindle motor 21, the disk table 22, the chucking pulley 36, and the disk-like recording medium 100 are integrally rotated, and also one or both of the first optical pickup 24 and the second optical pickup 38 is/are moved in a radial direction of the disk-like recording medium 100, and recording or reproduction of an information signal to the disk-like recording medium 100 is performed.

At this time, since as described above, a constant gap exists between the lower surface of the disk-like recording medium 100 and the first rectifying plate part 18 and also a constant gap exists between the upper surface of the disk-like recording medium 100 and the second rectifying plate part, an air flow of both upper and lower surface sides of the disk-like recording medium 100 is rectified, and surface shake does not easily occur in the disk-like recording medium 100.

When rotation of the disk-like recording medium 100 is stopped, and recording or reproduction of the information signal to the disk-like recording medium 100 is ended, the cam sliders 40 and 40 are moved forward by the drive mechanism, the guided pins 13a and 13a of the first chassis unit 6 are slid from front ends of the front cam parts 41c and 41c to rear ends of the rear cam parts 41a and 41a of the first cam holes 41 and 41, respectively, and also the guided pins 31a and 31a of the second chassis unit 26 are slid from front ends of the front cam parts 42c and 42c to rear ends of the rear cam parts 42a and 42a of the second cam holes 42 and 42, respectively. Accordingly, the first chassis unit 6 is moved downward and also the second chassis unit 26 is moved upward, and the first rectifying plate part 18 of the first chassis unit 6 and the second rectifying plate part of the second chassis unit 26 are spaced aside from each other. In addition, the disk table 22 and the chucking pulley 36 are spaced aside from each other, and chucking to the disk-like recording medium 100 is released.

The disk-like recording medium 100 is held again by the disk holding part of the conveyance device, is conveyed in a discharge direction (forward) by the conveyance device, and is stored in the disk cartridge.

CONCLUSION

As described above, the disk drive apparatus 1 includes: the first chassis unit 6 that has the first pickup base 8 and the first base chassis 7; and the second chassis unit 26 that has the second base chassis, and in the disk drive apparatus 1, the first rectifying plate part 18 is provided at the first base chassis 7, and the second rectifying plate part is provided at the second base chassis.

Accordingly, since a part of each of the first base chassis 7 and the second base chassis desired to arrange the disk table 22 and the chucking pulley 36 is provided as the first rectifying plate part 18 and the second rectifying plate part, respectively, a stable rotational state of the disk-like recording medium 100 can be secured without causing higher manufacturing cost.

In addition, the second pickup base 28 at which the second optical pickup 38 has been arranged is provided at the second chassis unit 26.

Accordingly, it becomes possible to perform recording or reproduction of the information signal to both the sides of the disk-like recording medium 100, and the stable rotational state of the disk-like recording medium 100 can be secured after improvement in functionality of the disk drive apparatus 1 is secured.

Note that although in the above, has been shown an example where the first pickup base 8 is provided at the first chassis unit 6, and where the second pickup base 28 is provided at the second chassis unit 26, in the disk drive apparatus 1, a pickup base may be provided at one of the first chassis unit 6 and the second chassis unit 26, and recording or reproduction of the information signal may be performed to one surface of the disk-like recording medium 100.

Furthermore, when the first chassis unit 6 and the second chassis unit 26 are moved, the first base chassis 7 and the second base chassis are connected to each other in the thickness direction of the disk-like recording medium 100.

Accordingly, positioning of the first base chassis 7 and the second base chassis is performed, thereby relative positions of the first rectifying plate part 18 and the second rectifying plate part become clear, positioning of the first rectifying plate part 18 and the second rectifying plate part to the disk-like recording medium 100 is performed, and a good rectifying function by means of the first rectifying plate part 18 and the second rectifying plate part can be secured.

Furthermore, the first folded part 18a of the first rectifying plate part 18 and the second folded part of the second rectifying plate part are butted against and connected to each other.

Accordingly, an outer peripheral side of the disk-like recording medium 100 is blocked by the first folded part 18a and the second folded part, and a still better rectifying function by means of the first rectifying plate part 18 and the second rectifying plate part 33 can be secured.

In addition, both the first chassis unit 6 and the second chassis unit 26 are moved in the thickness direction of the disk-like recording medium 100, and chucking operation of the disk-like recording medium 100 is performed.

Accordingly, it becomes possible to minimize movement amounts of the first rectifying plate part 18 and the second rectifying plate part in the thickness direction of the disk-like recording medium 100, respectively, and position deviation of the first rectifying plate part 18 and the second rectifying plate part to the disk-like recording medium 100 can be suppressed, respectively.

Furthermore, since the first chassis unit 6 and the second chassis unit 26 are simultaneously moved, and chucking operation of the disk-like recording medium 100 is performed, speed-up of operation in the disk drive apparatus 1 can be achieved.

In addition to that, since provided are the cam sliders 40 and 40 that move the first chassis unit 6 and the second chassis unit 26, the first chassis unit 6 and the second chassis unit 26, which are separate members, are moved by the cam sliders 40 and 40, and simplification of a structure of the disk drive apparatus 1 can be achieved.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) A disk drive apparatus including:
a first chassis unit that has a pickup base at which an optical pickup and a disk table have been disposed, and a first base chassis to which the pickup base has been attached; and
a second chassis unit that has a second base chassis and at which a chucking pulley has been disposed,
wherein a first rectifying plate part is provided at the first base chassis,
wherein a second rectifying plate part is provided at the second base chassis, and
wherein, when a disk-like recording medium is conveyed in a space between the first chassis unit and the second chassis unit, at least one of the first chassis unit and the second chassis unit is moved in a thickness direction of the disk-like recording medium, the disk-like recording medium is sandwiched and held by the disk table and the chucking pulley, and also the first rectifying plate part and the second rectifying plate part are located opposed to the disk-like recording medium.

(2) The disk drive apparatus according to (1), wherein at the second chassis unit, provided is a pickup base at which an optical pickup has been disposed and that has been attached to the second base chassis.

(3) The disk drive apparatus according to (1) or (2), wherein, when at least one of the first chassis unit and the second chassis unit is moved in the thickness direction of the disk-like recording medium, the first base chassis and the second base chassis are connected to each other in the thickness direction of the disk-like recording medium.

(4) The disk drive apparatus according to (3),
wherein an outer periphery of the first rectifying plate part is provided as a first folded part folded to a side of the second base chassis,
wherein an outer periphery of the second rectifying plate part is provided as a second folded part folded to a side of the first base chassis, and
wherein, when at least one of the first chassis unit and the second chassis unit is moved in the thickness direction of the disk-like recording medium, the first folded part and the second folded part are butted against and connected to each other.

(5) The disk drive apparatus according to any one of (1) to (4), wherein the first chassis unit and the second chassis unit are moved in the thickness direction of the disk-like recording medium.

(6) The disk drive apparatus according to (5), wherein the first chassis unit and the second chassis unit are simultaneously moved.

(7) The disk drive apparatus according to (6), wherein provided are cam sliders that are moved in a predetermined direction and move the first chassis unit and the second chassis unit.

What is claimed is:

1. A disk drive apparatus comprising:
a first chassis unit that has a pickup base at which an optical pickup and a disk table have been disposed, and a first base chassis to which the pickup base has been attached; and
a second chassis unit that has a second base chassis and at which a chucking pulley has been disposed,
wherein a first rectifying plate part is provided at the first base chassis,
wherein a second rectifying plate part is provided at the second base chassis, and
wherein, when a recording medium is conveyed in a space between the first chassis unit and the second chassis unit, at least one of the first chassis unit and the second chassis unit is moved in a thickness direction of the recording medium, the recording medium is sandwiched and held by the disk table and the chucking pulley, and also the first rectifying plate part and the second rectifying plate part are located opposed to the recording medium.

2. The disk drive apparatus according to claim 1, wherein at the second chassis unit, provided is a pickup base at which an optical pickup has been disposed and that has been attached to the second base chassis.

3. The disk drive apparatus according to claim 1, wherein, when at least one of the first chassis unit and the second chassis unit is moved in the thickness direction of the recording medium, the first base chassis and the second base chassis are connected to each other in the thickness direction of the recording medium.

4. The disk drive apparatus according to claim 3,
wherein an outer periphery of the first rectifying plate part is provided as a first folded part folded to a side of the second base chassis,
wherein an outer periphery of the second rectifying plate part is provided as a second folded part folded to a side of the first base chassis, and
wherein, when at least one of the first chassis unit and the second chassis unit is moved in the thickness direction of the recording medium, the first folded part and the second folded part are butted against and connected to each other.

5. The disk drive apparatus according to claim 1, wherein the first chassis unit and the second chassis unit are moved in the thickness direction of the recording medium.

6. The disk drive apparatus according to claim 5, wherein the first chassis unit and the second chassis unit are simultaneously moved.

7. The disk drive apparatus according to claim 6, wherein provided are cam sliders that are moved in a predetermined direction and move the first chassis unit and the second chassis unit.

\* \* \* \* \*